(No Model.)
P. G. BURGESS.
CURRENT STRENGTH INDICATOR.
No. 541,148. Patented June 18, 1895.
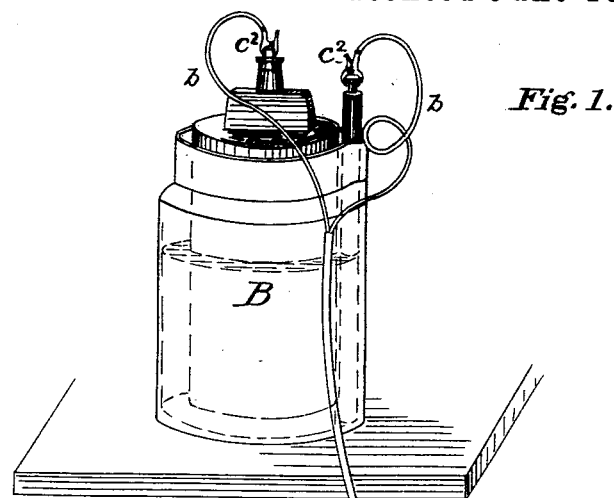
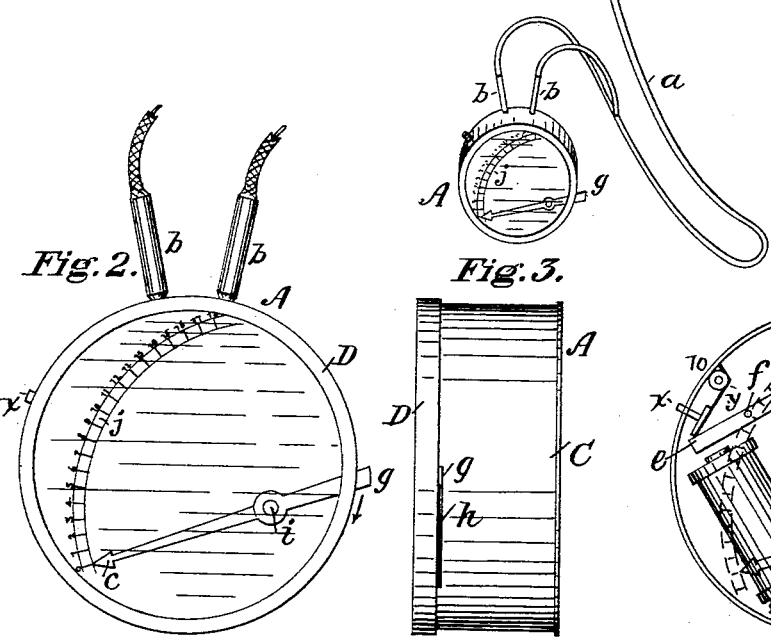
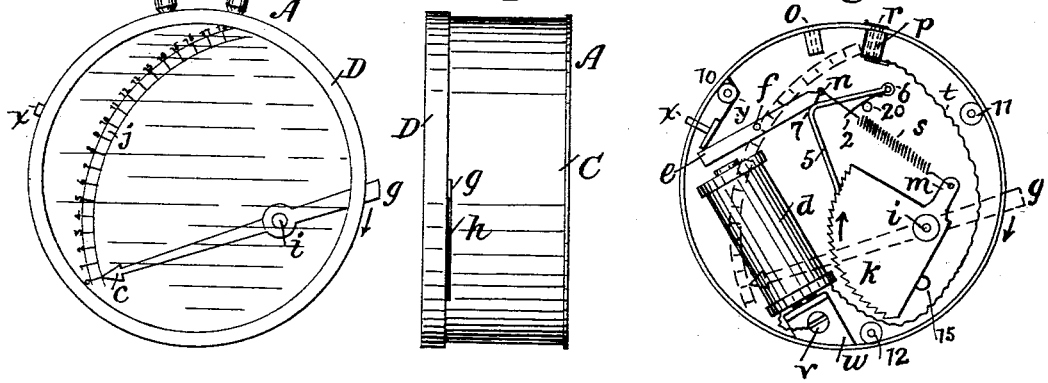
Attest,
Joseph A. Gately
Leo Willis Pierce
Inventor,
Percival G. Burgess.

UNITED STATES PATENT OFFICE.

PERCIVAL G. BURGESS, OF BOSTON, MASSACHUSETTS, ASSIGNOR TO THE AMERICAN BELL TELEPHONE COMPANY, OF SAME PLACE.

CURRENT-STRENGTH INDICATOR.

SPECIFICATION forming part of Letters Patent No. 541,148, dated June 18, 1895.

Application filed March 25, 1895. Serial No. 543,121. (No model.)

*To all whom it may concern:*

Be it known that I, PERCIVAL G. BURGESS, residing at Boston, in the county of Suffolk and State of Massachusetts, have invented certain Improvements in Current-Strength Indicators, of which the following is a specification.

The present invention has reference to a class of electrical devices by which the strength of current in an electric circuit is indicated upon a graduated scale.

The special object of the invention is to determine the relative strength of current between the poles of batteries in order to ascertain their efficiency. For this purpose means are provided for obtaining an indication of the amount of force required to detach an armature from the core of a magnet whose coils are in the circuit of the battery to be tested, it being obvious that this force is proportional to the strength of the current exciting the coils of the magnet. This indication may be conveniently obtained by applying the force to detach the armature through a spiral or other spring, one end of which is connected with the armature, and the other with a movable indicating device or pointer. By arresting the latter in its movement at the point where the armature is detached from the magnet, the distance through which it has traveled from its zero or starting point will be an approximate indication of the strength of the current.

The apparatus herein described, in which this invention is embodied, comprises an electro-magnet, an armature therefor, and mechanically actuated detaching mechanism adapted to exert a gradually increasing force on the armature in opposition to the attraction of the magnet, said mechanism being associated with an indicating needle or pointer arranged to be moved by the operation of the said detaching mechanism over a graduated scale upon a dial, and a stopping or locking device which is brought into action at the moment the armature is detached from the pole or poles of the electro-magnet to prevent the further movement of the indicating needle. By these instrumentalities the manual force required to detach the armature, which indicates approximately the strength of the current or condition of the battery, is registered.

I inclose the mechanism in a suitable box or casing preferably of metal, provided with an opening in one side thereof through which the graduated scale and pointer are seen. There are two plug sockets in one side or edge of the box in which the terminals of a pair of conducting wires, in a flexible insulated cord, are inserted to connect with the inclosed electro-magnet, the opposite terminals of the wires being provided with means for connection with the poles of a battery. Binding screws may of course be substituted for these sockets, if desired.

To specifically describe the invention reference is made to the drawings, in which—

Figure 1 represents in perspective the current-strength indicator, which is shown connected by a flexible cord to the poles of a battery. Figs. 2 and 3 are face and side views of the said indicator. Fig. 4 is a view with the front portion removed to show the interior mechanism, and Figs. 5 and 6 are respectively face and interior views of a modified construction of the indicator.

In the drawings A represents the inclosing metal case made in two parts C and D, which are held together by screws, extending from the rear into the posts 10, 11, 12, secured to the front portion. Upon removing the screws, the front portion can be lifted off and the several parts be seen as in Fig. 4.

$d$ is an electro-magnet secured to a bracket $w$, which is fastened to the bottom of the case by the screw $v$, under the head of which one end of the helix is held, the circuit being from the bracket to the terminal holder or post by the substance of the metal case. The other end of the helix is connected to the metal terminal $p$ in the insulating block $r$ by the wire $t$.

$e$ is an armature pivoted at $f$, one end being in inductive relation to the pole of the electro-magnet and the other end connected by the spiral spring $s$ to the arm $m$ extending from the ratchet segment $k$ pivoted at $i$.

5 is a pawl pivoted at 6, and bent to a right angle; its free end being adapted to engage the teeth of the ratchet $k$, and its knee 7 resting under the armature $e$.

Upon the front of the case D is a dial having on its face a graduated scale $j$ over which travels the arrow shaped end of a needle or pointer $c$, the said pointer being pivoted at $i$ to move with the segmental ratchet $k$. At the opposite end of the pointer is a lever $g$ projecting through a slot $h$ in the side of the case. The pointer and the scale are shown in Fig. 4 in dotted lines.

$x$ is a pin projecting through the side of the case, its inner end being secured to a spring $y$ which is soldered to the post 10.

Figs. 2, 3, and 4 represent the indicator at rest, the needle $c$ pointing to zero. The spring $s$ pulls the segment $k$ against its stop 15, and the armature $e$ against the pawl 5 forcing its end into engagement with a tooth of the ratchet; but when the terminals $o$ and $p$ are connected to the poles of a battery, as shown in Fig. 1, the current therefrom energizes the helix of the electro-magnet $d$, attracting one end of the armature $e$ to its pole, and as its opposite end rises, the spring 2 which rests upon the post 20 lifts the pawl 5 from the ratchet $k$. The inspector or person testing the battery pushes the exposed end of the lever $g$ in the direction of the arrow, thereby moving the ratchet in an opposite direction as indicated by the arrow marked thereon, at the same time pulling or stretching the spiral spring $s$ until the tension thereon overcomes the attraction of the magnet core for the armature. The latter is thus drawn away from the magnet and instantly presses the pawl into engagement with the ratchet, arresting and locking the movement thereof, and of lever $g$, and its pointer $c$. The latter indicates on the scale $j$ the degree of resistance offered by the excited magnet to the detachment of its armature, this resistance being as already explained, an indication of the condition of the battery in circuit with the said magnet.

It will be seen that the greater the strength of the current, the farther the pointer will be allowed to travel over the scale.

When the pawl 5 engages the ratchet $k$ by reason of the backward motion of the armature, the detaching mechanism and pointer are arrested, and locked in the position where the stop is made, for in the first place further advance is prevented by the direction of the ratchet teeth with reference to the pawl which engages them; and in the second place, a balance of forces or a mechanical circuit, so to speak, is established by the stretched spring $s$, which being nearly parallel in its line of action with the active end 5 of the knee pawl, exercises a strong frictional brake effect, which prevents the backward movement of the said ratchet, and effectually locks the mechanism wherever and whenever the advance of the said ratchet and pointer is stopped by the operation of the pawl. The pin $x$ whereby the armature may be manually brought back to the magnet pole, is thus ordinarily necessary; one of its functions being to tilt the said armature and thereby release the pawl 5 from engagement with the toothed segment $k$, thus unlocking the detaching mechanism and permitting the recoil of the ratchet and pointer. It has, however, another function, namely, to bring the armature initially to the magnet pole, in case the battery tested is so badly out of order, or develops a current so weak, that it cannot excite the magnet sufficiently to enable it to attract its armature, unless the latter is first brought nearer to its poles.

Figs. 5 and 6 show a modification of the indicator by means of which a greater scope or range of indication can be obtained. The armature $e$ is balanced on the pivot $f$, its spring $s$ being connected to the circumference of the gear wheel 9 which meshes with a pinion 16 upon the same spindle with the ratchet wheel 17, to which spindle the pointer $c$ is also connected. In this case the pawl 5 is connected to the armature $c$ and engages with the ratchet 17. The operation of this modification is the same as the device previously described. The pointer $c$ however, is rotated by a lever on the shaft $i$ at the back of the case, and has a more extended range; and with the gear and pinion shown it can make a double revolution about the graduated scale $j$. If desirable the indications can be divided into two scales upon two dials, one to indicate units and another to indicate tens. In Fig. 5 a dial hole is made in the metal front D, behind which is placed a piece of glass 3, upon which a scale $k$ of paper is pasted, leaving an annulus of clear space 4 through which the tip of pointer $c$ is seen.

Having now fully described my invention, I claim—

1. In a current strength indicator, the combination of an electro-magnet and armature; a mechanically actuated detaching mechanism for applying to said armature a steadily increasing force in opposition to the attraction of the magnet; an indicating device or pointer actuated by the said detaching mechanism; and a stopping or locking device, controlled by the detachment of the said armature from the magnet poles, and operating at the moment of detachment to arrest and prevent the further movement of the said indicating device, whereby an approximate indication is obtained of the resistance offered by said magnet to the movement of the armature.

2. A current strength indicator comprising in combination, an electro-magnet through the coils of which the current to be tested is to circulate, an armature for said magnet, a spring connected with said armature and adapted when put under tension to act thereon in opposition to the attractive force of the magnet, an indicator, means for moving the same against the force of said spring, and means for arresting the indicator at the moment the tension of said spring overcomes the attractive force of the magnet, substantially as described.

3. A current strength indicator or battery gage dependent for its operation on the amount of force required to detach an armature from an electro-magnet excited by the current to be tested, and comprising a needle or indicating pointer moving over a graduated scale; connections for exerting upon said armature in opposition to the magnet, a force increasing with the movement of said needle or pointer; and stop mechanism therefor, actuated by the detachment of the armature, and adapted thereupon to engage and prevent the further advance of the said pointer, whereby the position of the said pointer when stopped furnishes an indication of the approximate strength of the current or condition of the battery, substantially as described.

4. A current strength indicator or battery gage dependent for its operation on the amount of force required to detach an armature from an electro-magnet excited by the current to be tested, and comprising a needle or indicating pointer moving over a graduated scale; and stop mechanism therefor, actuated by the said detachment of the armature, and adapted thereupon to engage and prevent the further advance of the pointer, whereby the position of the said pointer when stopped is enabled to indicate the approximate strength of the current or condition of the battery, substantially as described.

5. The combination, in a current strength indicator, of a casing having upon its front a dial upon the face of which is a graduated scale, and inclosing an electro-magnet with an armature; a mechanically actuated armature-detaching mechanism consisting of a lever connected to the said armature by a spring; an indicating pointer actuated by the said lever and caused to move over the graduated scale; and locking mechanism comprising a ratchet moving with the said lever, and a pawl thrown into engagement with the ratchet when the tension of said spring overcomes the attractive power of the magnet upon its armature, substantially as described.

6. The combination, in a current strength indicator, of a casing having upon its front a dial upon the face of which is a graduated scale, and inclosing an electro-magnet with an armature; a mechanically actuated armature-detaching mechanism, consisting of a lever connected to the said armature by a spring; an indicating pointer actuated by the said lever and caused to move over the graduated scale; a locking device consisting of a ratchet also moving with the said lever, and a pawl thrown into engagement with said ratchet when the tension of said spring overcomes the attractive force of its magnet upon the armature, and means for releasing the pawl from engagement with the ratchet, substantially as described.

In testimony whereof I have signed my name to this specification, in the presence of two subscribing witnesses, this 28th day of February, 1895.

PERCIVAL G. BURGESS.

Witnesses:
GEO. WILLIS PIERCE,
JOSEPH A. GATELY.